June 27, 1967 S. R. BARNETTE 3,328,499
METHOD OF MAKING PLASTIC DECORATIVE SHEET ARTICLES
Filed Jan. 14, 1963 2 Sheets-Sheet 1
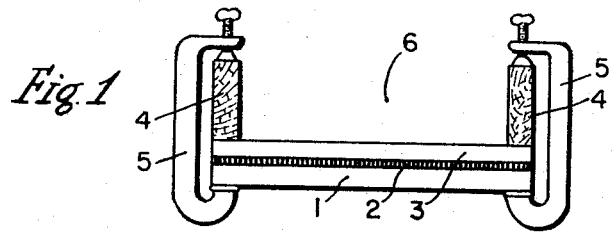
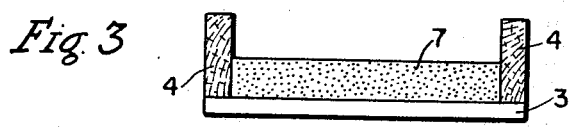
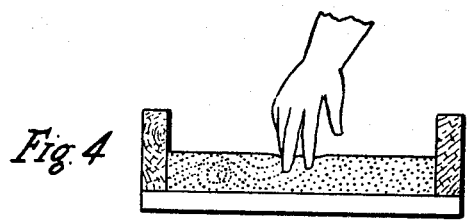
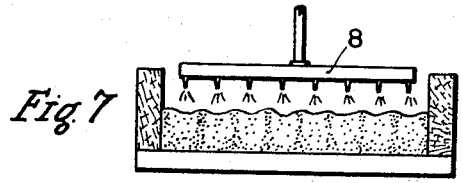
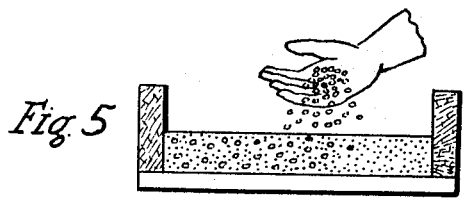
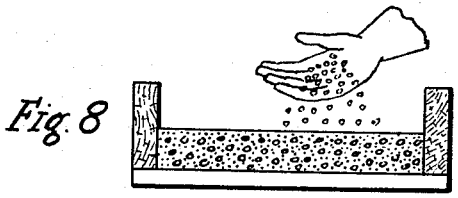
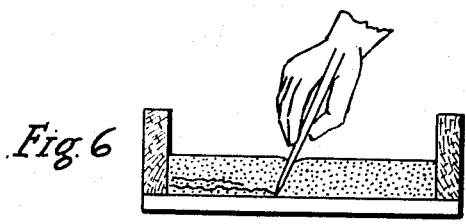
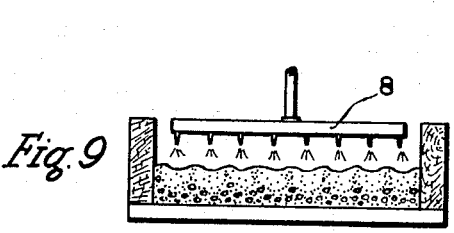
INVENTOR.
BY Stanley Ronald Barnette June 27, 1967  S. R. BARNETTE  3,328,499
METHOD OF MAKING PLASTIC DECORATIVE SHEET ARTICLES
Filed Jan. 14, 1963  2 Sheets-Sheet 2
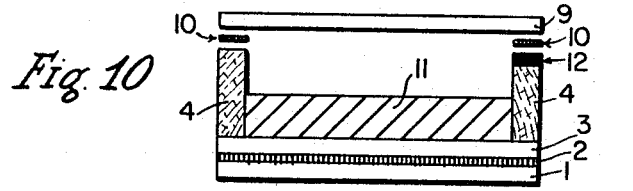
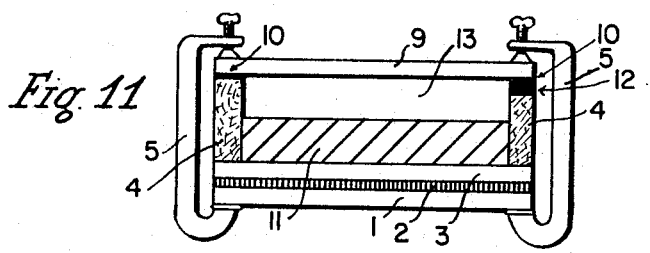
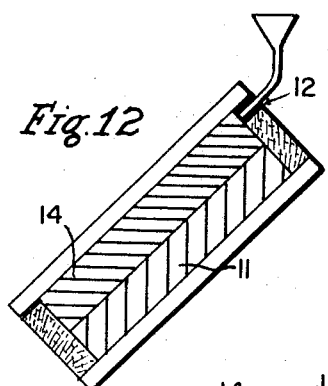
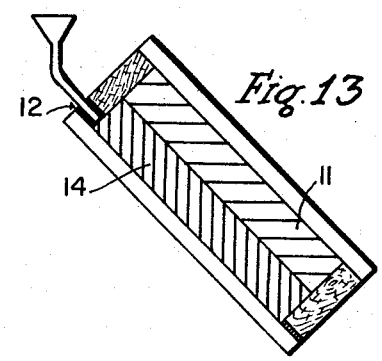
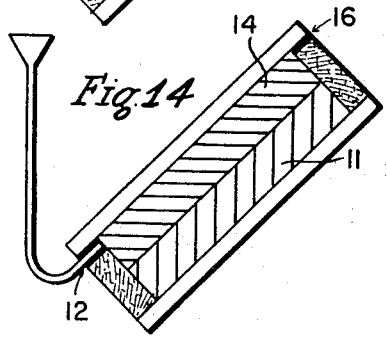
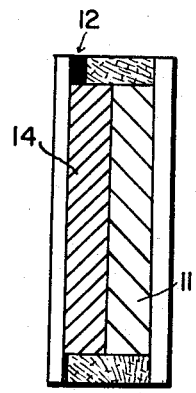
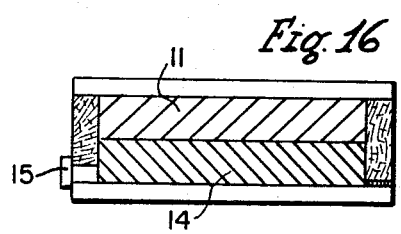
INVENTOR.
BY Honley Ronald Barnette

United States Patent Office 3,328,499
Patented June 27, 1967

3,328,499
METHOD OF MAKING PLASTIC DECORATIVE
SHEET ARTICLES
Stanley Ronald Barnette, 90 Cherokee St.,
Miami Springs, Fla. 33166
Filed Jan. 14, 1963, Ser. No. 254,849
The portion of the term of the patent subsequent to
Jan. 15, 1980, has been disclaimed
7 Claims. (Cl. 264—108)

This application is a continuation-in-part of my co-pending application, Ser. No. 808,599, filed Apr. 24, 1959, now U.S. Patent Number 3,072,973 issued Jan. 15, 1963.

This invention relates to methods of forming a plastic sheeting by a casting process which includes having the sheeting with plain or decorative surfaces and a decorative deep three-dimensional effect formed therein the plastic.

The invention also relates to articles of manufacture in the form of cast plastic sheeting.

Another object of the invention is to provide direct and indirect methods to produce the decorative effect into the resin, comprising the direct method of contact with the resin and the indirect method wherein no contact with the resin is necessary, and apparatus therefor.

The method or process of production is such that the sheet produced, whether with or without a core or filler, can be wholly or partially transparent and of any desired variety or mixtures of colors. By suitable embedments either per se or in addition to the core or filler, any number of beautiful designs and decorative motifs can be had.

Other objects and advantages will become apparent in the following specifications when considered in the light of the attached drawings, in which:

FIGURES 1 and 2 are cross-sectional views of molds that may be employed in the article of this invention.

FIGURE 3 is a cross-sectional view of one quantity of liquid catalyzed resin poured into the open top mold.

FIGURES 4 through 6 are cross-sectional views illustrating the steps of decorative by hand means the liquid resin to produce a sheeting article with one finished surface.

FIGURES 7 through 9 are cross-sectional views illustrating the steps of decorative by blowing air in the liquid resin to produce a sheeting article with one finished surface.

FIGURES 10 through 16 are cross-sectional views of the steps involved in order to produce a sheeting or slab article with two finished surfaces.

With reference to the drawings, the instant invention will now be described with reference to the drawings:

FIGURE 1 depicts a mold assembly comprising a leveled platform 1, a metal foil blanket 2, a mold base 3 and mold walls 4. The mold walls and mold base are tightly secured by means of clamps 5 to form the open mold 6. The open mold 6 in some instances may be replaced by a one section cavity mold as illustrated in FIGURE 2, whenever standard sizes are manufactured.

The simple mold forms illustrated in 4 of FIGURE 1 are of the melamine (Formica covered plywood) type as they can be very readily shaped to provide the desired side wall contours of the mold.

The mold base 3 as indicated in FIGURE 1, is a glass of melamine or any nonporous type, and a releasing compound for the mold base and mold walls must be used. In the event that a polyester film is used to form the mold base and or the mold walls, no coating is necessary as this material in itself acts as a ready release. The surface of the mold base may be smooth, textured, embossed and with a high gloss or satin finish conforming to the desired exterior surface finish of the article.

The one section cavity mold illustrated in FIGURE 2 includes rubber, metal, glass or plastic material and in the case of rigid materials, the mold walls will form with the mold base an angle over 90° to permit no undercuts for the easy removal of the article from the mold.

Referring to the direct and indirect methods of forming a deep three-dimensional decorative effect into the resin, this will be illustrated with an example of a 48" square sheet and the steps involved.

Any thermosetting or thermoplastic resinous material or matter which hardens with cure or setting, such as epoxy, polyester, styrene, methyl-methacrylate or any others, can be used in formulating the cast laminated sheeting and enveloping process. However, for descriptive purposes in respect to the methods used, the polyester thermosetting variety formulation is used in this description. If thermoplastics are used, the described method will vary in that instead of the air cure, controlled direct heat at a temperature sufficient to harden or solidify the thermoplastic, but insufficient to reliquify the same is employed. For all examples a mixture is prepared consisting of: 1 quart of a mixture of polyester resin, $\frac{1}{10}$ quart of styrene and 1 dram of cobalt napthenate (6% cobalt).

In the direct method, there are three variations:

First, adding to the mixture one amount of pearlescent pigment, stirring, adding 1% of methyl ethyl ketone peroxide (60%) and pouring the mixture into the mold, as depicted in FIGURE 4 and by hand means agitating the mixture in a combing motion to disperse and orient the pearlescent pigment forming a pattern of choice, suspending this combing operation as soon as the increase in the resin viscosity indicates that the gel stage is reached so that the pattern will remain fixed into the resin.

The second variation consists in pouring the catalyzed liquid resin with 1% of methyl ethyl ketone peroxide (60%) in the mold as in FIGURE 3 and introducing mother of pearl flakes into the liquid resin as indicated in FIGURE 5, forming a desired pattern of choice before the increase in the resin viscosity indicates that the gel stage is reached and which proper timing can be controlled by means of accelerator-and-catalyst-to-resin ratios and operating temperature.

The third variation depicted in FIGURE 6 comprises introducing the decorative media in the resin, by means of a fine pointed instrument that has previously been slightly impregnated or tipped with black polyester paste, and black veins are formed in the resin mixture comprising some drops of white polyester paste in order to have a translucent layer simulating a marble surface.

In the indirect method there are two variations:

First, adding to the mixture one amount of pearlescent pigment stirring, adding the catalyst and pouring the mixture into the mold as in FIGURE 3, subjecting said mixture to an air stream applied to the top surface of the liquid mixture by means of a plurality of upper nozzles 8 disposed and arranged in order to create a predetermined turbulence into said mixture and disperse and orient said pearlescent pigment forming a pattern, the air stream maintained until the resin viscosity indicates that the gel stage is reached and suspending said air treatment so that the decorative effect is permanently fixed into the resin. This is indicated in FIGURE 7.

The second variation consists in pouring the catalyzed liquid mixture in the mold as in FIGURE 8 introducing mother of pearl dust into the liquid resin subjecting said mixture to an air stream applied, as indicated in FIGURE 9, to the top surface of the liquid mixture by means of a plurality of upper nozzles 8 disposed and arranged in order to create a predetermined turbulence into said mixture and disperse and orient said dust forming a pattern, the air stream maintained until the resin viscosity indicates that the gel stage is reached and suspending said air treatment so that the decorative effect is permanently fixed into the resin.

It should be understood that following the method and principles of the invention above disclosed that table tops, decorative panels, wall panels, as well as structural surfacing material of various kinds, may be formed.

The sheet produced by the methods described will have one finished surface with a decorative deep three-dimensional effect visible through the plastic and a secondary uneven and flat plastic surface, its flatness depending on the viscosity of the resin or the amount of monomer or thinner used.

In order to obtain a smoother secondary surface, this may be achieved by simply adding a small amount of melted paraffin to the styrene of the example. This secondary surface also may be sanded, polished or buffed.

In order to produce an article with two perfect desired finished surfaces, the additional steps to be followed are illustrated in FIGURES 10 through 16.

This is accomplished by means of fitting on top of the existing mold assembly after the clamps are removed, a top cover plate the underside of which conforms to the desired exterior surface finish of the article and a gasket to form a closed mold. This is depicted in FIGURE 10 wherein the top cover plate 9 and the gaskets 10 are in position to be fitted on top of the existing mold assembly described in FIGURE 1. In FIGURE 11 the closed mold is already formed with the clamps 5 tightly securing the top cover plate 9 and the gaskets 10 against the mold walls 4 forming a cavity 13 limited by the top surface of the last cured plastic 11, the mold walls of the existing mold 4, the gaskets 10 and the underside of the top cover plate 9. The slot 12 has previously been machined in the mold walls 4 to provide means to introduce the liquid resin into said cavity and to permit the air to escape through said opening.

Then the entire mold assembly is tilted to an appropriate position so as to permit to introduce the liquid catalyzed resin 14 into the cavity 13 either from the top or from the bottom, as illustrated in FIGURES 12 through 15. In order to facilitate the entrapped air to escape from the cavity, the slot 12 must be properly shaped and located and also the mold assembly can be rotated.

After the cavity is filled and no air bubbles are present the mold may be stored for cure in any desired position, one example illustrated in FIGURE 15, but preferably in a horizontal position depicted in FIGURE 16 so as to guarantee that the liquid resin remains on the face of the top cover plate plugging the slot by means of plug 15. This position permits better results, because the last plastic formed in opposite direction to the preceding layers when cured will provide isotropic properties, equal opposite stress and an extremely hard plastic surface.

The article when removed from the mold will show two perfect finished surfaces, polished, satin, embossed, raised, sculptured, etched, irregular, etc.

By means of this method it is possible to produce plastic sheets and slabs with two finished surfaces, transparent, opaque, decorative, etc., simply forming the desired layers in the horizontal mold and forming the last layer in the closed mold.

To form a transparent sheet with two plastic layers for example, the first transparent liquid catalyzed modified resin is poured into the open mold and permitted to cure, fitting the top cover plate and gaskets to form the closed mold and introducing into the cavity sufficient transparent liquid catalyzed modified resin to fill said cavity and permitting to cure until set.

Another example may comprise a sheet having a transparent layer, at least one decorative layer, and an opaque layer forming the background for the decorative effect. Also, a sheet comprising two outer transparent layers, at least two decorative layers and one opaque layer in the center of the article providing the background for the decorative effect may be produced.

What is claimed is:

1. The method of producing a mottled deep three dimensional cast plastic decorative article in an open horizontal mold by introducing an orientable media to decorate a liquid, with the base of said mold conforming to the desired exterior surface finish of said article, the steps which comprise introducing at least one predetermined quantity of a mixture of polymerizable and gelable liquid into said mold, said liquid having at least one amount of at least one kind of orientable media added thereto and by direct hand means mottling said media in said liquid by dispersing said orientable media at least partially downward from the uppermost liquid surface to achieve a deep three-dimensional decorative effect and pattern of choice, suspending said dispersing and orienting operation when the increase in viscosity of said liquid indicates the gel stage so that the mottled pattern is fixed in the plastic and curing said plastic to form a unitary solid cast plastic mottled article with at least one finished surface.

2. The method of claim 1 which includes the polymerizable liquid being transparent.

3. The method of claim 1 which includes the orientable media being colored.

4. The method of claim 1 which includes a film being used to form at least the surface of the article.

5. The method of claim 3 which includes the colored orientable media being pigment.

6. The method of claim 5 which includes the pigment media being introduced in the liquid by means of an instrument in forming a simulated marble effect.

7. The method of claim 5 whereby the polymerizable liquid mixture includes a dust filler.

References Cited

UNITED STATES PATENTS

| | | | |
|---|---|---|---|
| 2,285,122 | 6/1942 | McIntosh | 161—112 |
| 2,406,705 | 8/1946 | Mrazek | 264—246 |
| 2,480,750 | 8/1949 | Leary. | |
| 2,668,328 | 2/1954 | Porter. | |
| 2,969,106 | 1/1961 | Reibel et al. | 161—112 |
| 3,050,785 | 8/1962 | Cunningham | 264—246 |
| 3,072,973 | 1/1963 | Barnette | 264—308 |

OTHER REFERENCES

Iridescence Built into Plastics—Modern Plastics January 1951 pp. 71–73.

ROBERT F. WHITE, *Primary Examiner.*

L. S. SQUIRES, J. A. FINLAYSON,
*Assistant Examiners.*